United States Patent [19]

Nguyen et al.

[11] Patent Number: 5,732,043
[45] Date of Patent: Mar. 24, 1998

[54] OPTIMIZED DETERMINISTIC BEARINGS ONLY TARGET MOTION ANALYSIS TECHNIQUE

[75] Inventors: Dien V. Nguyen, Gardena; Fredrick A. Steiner, Fullerton, both of Calif.; Richard H. Scales, Vienna, Va.

[73] Assignee: Hughes Aircraft Company now known as Hughes Electronics, Los Angeles, Calif.

[21] Appl. No.: 537,309

[22] Filed: Jun. 12, 1990

[51] Int. Cl.⁶ .................................................. G01S 3/80
[52] U.S. Cl. ........................... 367/127; 367/120; 367/124
[58] Field of Search ........................... 367/120, 124, 367/125, 126, 127, 129, 99, 104, 130

[56] References Cited

U.S. PATENT DOCUMENTS 4,958,331  9/1990  Wardle ........................................ 367/130

*Primary Examiner*—Daniel T. Pihulic
*Attorney, Agent, or Firm*—G. S. Grunebach; M. W. Sales; W. K. Denson-Low

[57] ABSTRACT

A method for selecting a set of four target bearings from a plurality of bearing measurements to optimize rapidity, accuracy and stability of a target track solution in a bearings-only target motion algorithm. Four bearings are selected to generate the deterministic solution by first selecting a candidate bearing set, then computing a set of "n" solutions from the candidate set and others adjacent thereto. Motion parameters are then computed, and any solution exhibiting parameters outside a user defined deviation from the mean is discarded. The mean target parameters of the remaining solutions may again be computed, and further culling out performed, until the desired distribution is achieved. An optimal solution is chosen as the solution from the remaining sample space that is closest to the mean in target range, course and speed. The other solutions in the remaining solution sample space may be displayed to an operator in the form of a scatter plot of all solutions, or by a range envelope encompassing the extent of solution ranges.

12 Claims, 2 Drawing Sheets

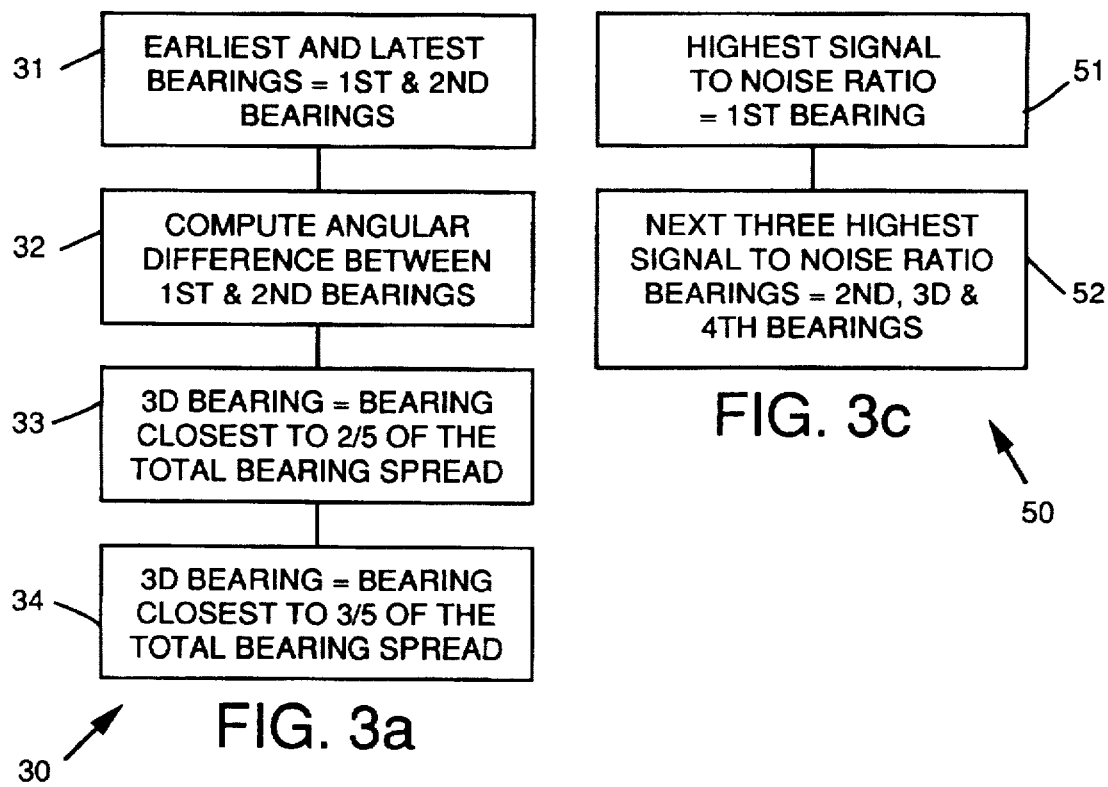
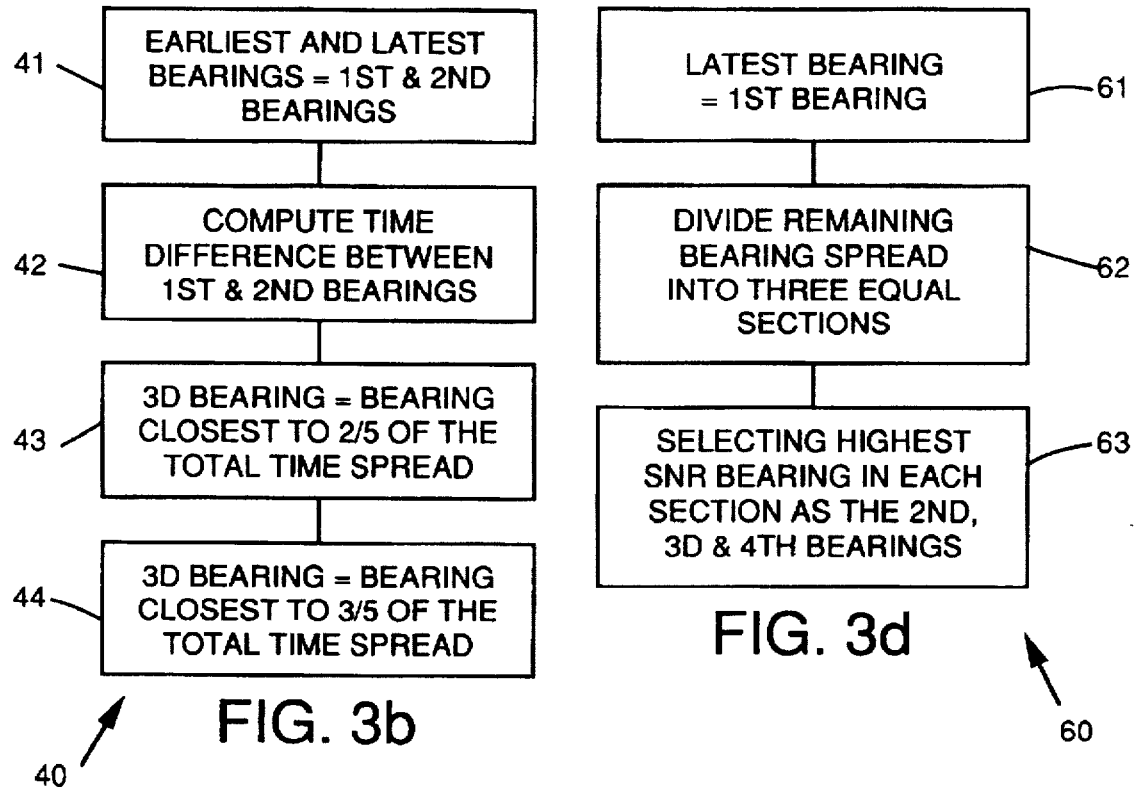

OPTIMIZED DETERMINISTIC BEARINGS ONLY TARGET MOTION ANALYSIS TECHNIQUE

BACKGROUND

The present invention relates to target motion analysis techniques, and more particularly, to a method of tracking targets using only bearing data.

There has long existed a method of passively utilizing received sonar bearings to track a target, and a four bearing deterministic solution that provides the target motion parameters is well known. This technique has been previously implemented using a plotting board to plot a series of bearings received from a bearing source such as passive sonar, and the target four bearing solution was graphically constructed on the plotting board. Attempts have been made to computerize the method, but have met with little real success, since the deterministic approach is susceptible to inaccuracies in bearing measurements and consequently often results in large errors in computation of target parameters. Furthermore, the deterministic solution with inaccurate data often exhibits instabilities in the solution, thus rendering the method suspect.

Another target motion analysis technique utilizes stochastic processes and Kalman filtering techniques. The stochastic optimization techniques require significant waiting time for solutions to converge and are more applicable to long range situations where the time necessary to generate a solution is not critical.

Thus, there is a need for a method that rapidly determines target range, course and speed but does not require continuous or sequential data to arrive at a solution. What is needed is a target motion technique that is particularly useful in short range target tracking situations when continuous bearing information is difficult to maintain.

Accordingly, it is an objective of the present invention to provide a four bearing target motion analysis technique that enhances the timeliness and the stability of the solution. Another objective of the invention is the provision of a four bearing target motion analysis technique that gives a real time indication of the validity of the solution. A further objective of the present invention is to provide optimum bearing selection techniques for four bearing target motion analysis to enhance the accuracy and the solution stability.

SUMMARY OF THE INVENTION

In accordance with these and other features and objectives of the present invention, there is provided a deterministic, bearings only, target motion analysis method comprising the following steps. A moving platform including a bearing detection device is provided. The azimuth of a target of interest is successively and periodically recorded while the platform is moved to provide a multiplicity of stored bearings, and wherein the direction of platform motion is changed during the recording process. A candidate set of four bearings is selected from the multiplicity of stored bearings, wherein one bearing of the set occurs prior to the change in platform direction.

A set of n target bearing solutions is computed from the candidate set of bearings and adjacent bearings. The mean target range, course and speed is then computed from the set of n target bearing solutions in accordance with a predefined relationship. Any solutions exhibiting parameters deviating from a respective mean by a predefined amount are then discarded. Finally, an optimal solution from the remaining set of solutions is selected that is the closest to the mean in target range, course and speed. The information determined by the above method is then displayed to an operator.

If necessary, the mean range, course and speed of the target may be recomputed from the remaining set of solutions subsequent to the first discarding step. In this event, any solution exhibiting parameters outside a predefined variance from a respective mean is discarded until a desired distribution is achieved.

The computational steps may be performed in a number of ways: (1) the earliest and latest bearings are selected as the first and second bearings of the candidate set. The angular difference between the first and second bearings is then computed. The bearing that is closest to ⅔ of the total bearing spread is selected as the third bearing, and the bearing that is closest to ⅓ of the total bearing spread is selected as the fourth bearing; (2) the earliest and latest bearings are selected as the first and second bearings of the candidate set. The time difference between the first and second bearings is computed. The bearing that is closest to ⅔ of the total time difference is selected as the third bearing, and the bearing that is closest to ⅓ of the total time difference is selected as the fourth bearing; (3) the bearing having the highest signal to noise ratio is selected as the first bearing, and the bearings having the three next highest signal to noise ratio are selected as the second, third and fourth bearings; or (4) the latest bearing is selected as the first bearing. The remaining spread of bearings is divided into three sections of equal bearing spread. The respective bearings in each section that have the highest signal to noise ratio are selected as the second, third and fourth bearings.

More particularly, the present invention is an automatic method for optimally selecting a final solution of target range, course and speed from a large number of solutions to enhance accuracy and stability of a target track solution in a bearings-only target motion analysis algorithm. The final solution is closest to the mean of a user specified set of solutions. The selection technique is based upon performing a large set of solutions using corresponding sets of measurements. Each solution is compared to a user defined criterion describing a target track.

Four bearings are selected that are used to generate the deterministic solution by first selecting a candidate bearing set, then computing a set of "n" solutions from the candidate bearings and others adjacent to the candidate bearings. Parameters such as mean target course, speed, and range of the set of solutions are then computed, and any solution exhibiting parameters outside a user defined distance from the mean is discarded. The mean target parameters of the remaining solutions may again be computed, and further culling out performed, until the desired distribution is achieved.

An optimal solution is chosen as the one solution closest to the mean in target range, course and speed, of the remaining solution sample space. The other solutions in the remaining solution sample space may be displayed to the operator in the form of a "scatter plot" of all solutions, or by a "range envelope" encompassing the extent of solution ranges.

The deterministic approach to bearings-only target motion analysis yields an approximate target solution with far less data than traditional stochastic estimation techniques, thus providing valuable information to the operator long before stochastic techniques converge on a solution. The automatic parsing of the solutions also mitigates instabilities in the solution and insures rapid convergence of the solution. Additionally, the deterministic technique does not require continuous or sequential bearing data to arrive at a solution.

BRIEF DESCRIPTION OF THE DRAWINGS

The various features and advantages of the present invention may be more readily understood with reference to the following detailed description taken in conjunction with the accompanying drawings, wherein like reference numerals designate like elements, and in which:

FIGS. 3a–3d show the steps in submethods of the method of FIG. 2 further defining the computation of the candidate bearings.

DETAILED DESCRIPTION

Figure 1:
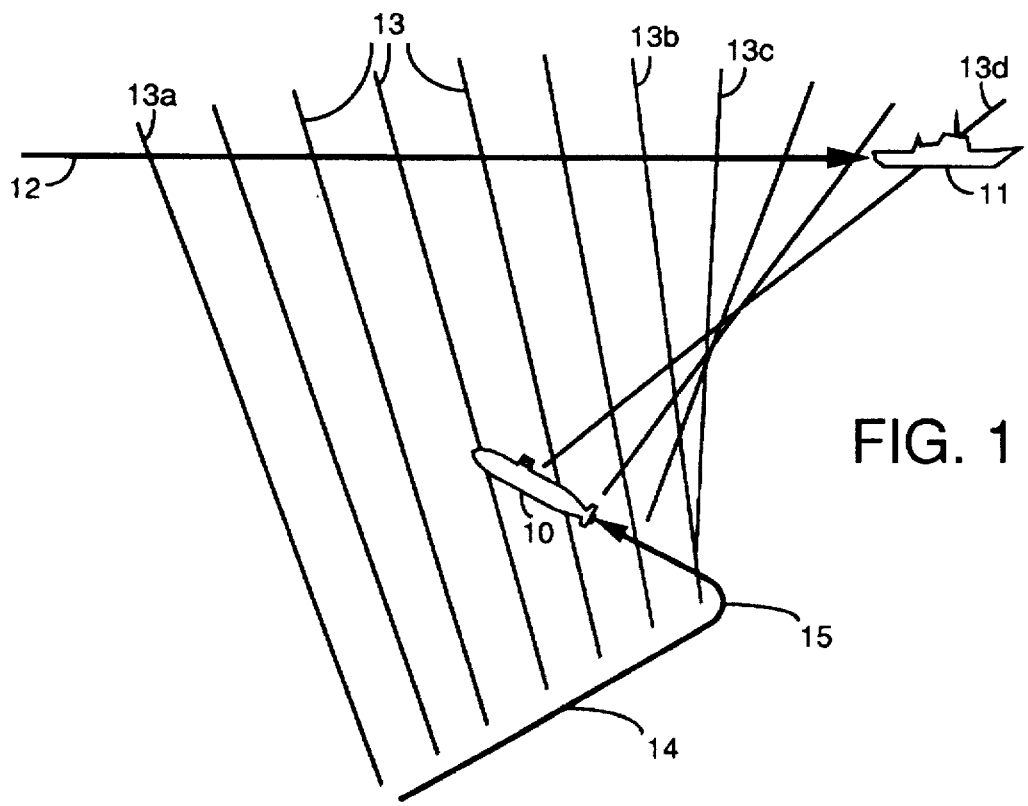
FIG. 1 shows shows tracks and bearings illustrating the geometry of the observer-target relationship underlying target motion analysis.

Referring to FIG. 1, there is shown a drawing of the geometry illustrating the relationship between an observer 10 (also called a platform 10) and a target 11 that underlies target motion analysis. An observer track 14 and a target track 12 represent the trajectories of the observer 10 and a target 11, respectively. A plurality of bearing lines 13 are shown that indicate the bearing in azimuth to the target 11.

During operation, spanning a specific target motion analysis time period, the observer 10 proceeds along the observer track 14 while taking measurements of the target bearings 13. A total of four target bearings 13 represents the minimum number of bearing measurements that are necessary in order to solve a set of equations that results in a solution to the target motion problem. FIG. 1 shows that the observer track 14 curves, and has a knee 15 in it, thus illustrating a maneuver by the observer 10. The maneuver is necessary in order to obtain a set of measurements that leads to a credible solution of the target parameters.

Typically, maneuvers by the observer 10 often comprise a series of sharp turns followed by straight tracks resulting in a series of dog legs. Bearing measurements are then most often taken along the straight sections of the various dog legs. The observer track 14 in FIG. 1 is characterized by such a dog leg but a single, continuous maneuver may be held throughout the target motion analysis time period. FIG. 1 shows a plurality of target bearings 13 from which are chosen various four bearing sets from which a deterministic solution may be computed. The target bearings 13 are representative of a number of measurements taken continuously along the target track 11. The result is a data base of bearing measurements that supplies bearing data on which the computer algorithm may compute a solution. This is explained in more detail below.

Figure 2:
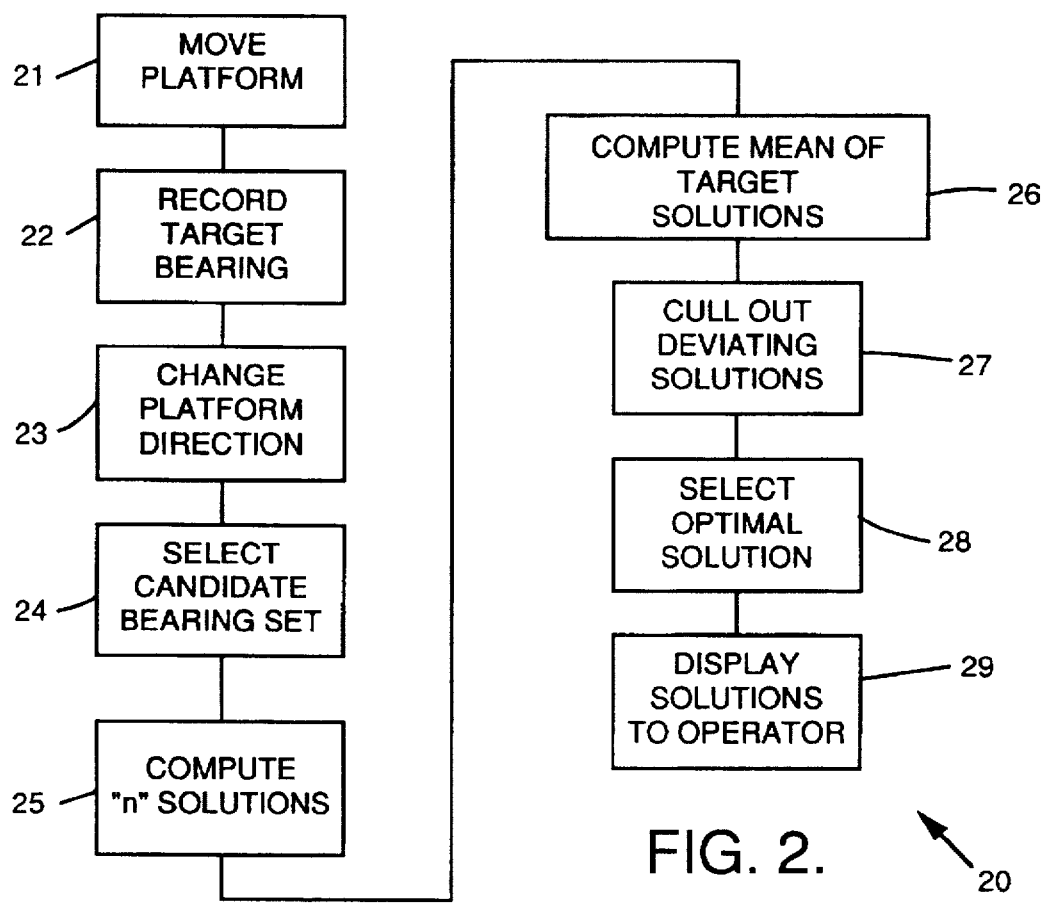
FIG. 2 shows a flow diagram representing the sequence of operations describing the method steps of the present invention.

Referring to FIG. 2, a flow diagram of operations defining one method 20 in accordance with the present invention is shown. The method 20 comprises the following general steps.

First, in step 21, a moving platform 10, such as a submarine, for example, including a bearing detection device, such as a sonar device, is provided. Second, in step 22, the bearings to a target 11 of interest are successively and periodically recorded while the platform 10 is moved to provide a multiplicity of stored bearings 13. Third, in step 23, the direction of the platform 10 is changed during the recording process. Fourth, in step 24, a candidate set of four bearings 13a–d is selected from the multiplicity of stored bearings 13, wherein at least one bearing of the set (but not all) occurs prior to the change in direction of the platform 10.

Fifth, in step 25, a set of n target bearing solutions is computed from the candidate set of bearings 13a–d and adjacent bearings 13. Sixth, in step 26, the mean target range, course and speed is then computed from the set of n target bearing solutions in accordance with a predefined relationship. Seventh, in step 27, any solution exhibiting parameters deviating from a respective mean by a predefined amount is then discarded, or culled out of the solution set. Steps 25 and 27 may be repeated as desired by the operator to further refine the solution set, based on other or more stringent criteria. Eighth, in step 28, an optimal solution from the remaining set of solutions is selected that is the closest to the mean in target range, course and speed. The information determined by the above method is then displayed to an operator in step 29.

If necessary, the mean range, course and speed of the target may be repetitively recomputed from the remaining set of solutions subsequent to the first discarding step. In this event, any solution exhibiting parameters outside a predefined variance from a respective mean is discarded until a desired distribution is achieved.

With reference to FIGS. 3a–d, the computational steps may be performed in a number of ways. These submethods are chosen at the discretion of the operator and different ones of the submethods may be chosen during a target motion analysis period.

As shown in FIG. 3a, the first submethod 30 comprises the following steps. The earliest and latest bearings 13a and 13d are selected as the first and second bearings of the candidate set in step 31. The angular difference between the first and second bearings is then computed in step 32. The bearing that is closest to ⅔ of the total bearing spread is selected as the third bearing 13c in step 33, and the bearing that is closest to ⅓ of the total bearing spread is selected as the fourth bearing 13b in step 34.

As shown in FIG. 3b, the second submethod 40 comprises the following steps. The earliest and latest bearings 13a and 13d are selected as the first and second bearings of the candidate set in step 41. The time difference between the first and second bearings is computed in step 42. The bearing that is closest to ⅔ of the total time difference is selected as the third bearing 13c set in step 43, and the bearing that is closest to ⅓ of the total time difference is selected as the fourth bearing 13b set in step 44.

As shown in FIG. 3c the third submethod 50 comprises the following steps. The bearing having the highest signal to noise ratio is selected as the first bearing in step 51, and the bearing having the three next highest signal to noise ratio are selected as the second, third and fourth bearings in step 52.

As shown in FIG. 3d the fourth submethod 60 comprises the following steps. The latest bearing is selected as the first bearing 13a in step 61. The remaining spread of bearings is divided into three sections of equal bearing spread in step 62. The respective bearings 13 in each section that have the highest signal to noise ratio are selected as the second, third and fourth bearings 13b, 13c, 13d in step 63.

In the event that none of the above submethods provide useful solutions, the operator may determine sets of solutions using a parametric spread. If insufficient bearing history is available to perform a selection, the operator may select each of the four bearings of the candidate bearing set from a parametric sensitivity analysis, based on random perturbations of known statistics. This procedure generates an envelope of possible target bearing solutions.

The method of FIG. 2 computes a solution for each bearing set in terms of values of relevant target parameters. The mathematical mean and the mathematical distribution of the target parameters are computed giving an overall performance index for the ensemble of solutions. In the case of the four bearing system the target parameters comprise the group of target course, speed and range. The choice of a candidate solution set depends generally on conditions existing while performing the target motion analysis method and is structured to optimize accuracy and rapid convergence of the solutions. In the case of a four bearing target motion analysis, the candidate bearing solution set may be any four bearings which constitute a basis for a solution.

The culling step, step 27, serves to perform a primary optimization procedure by rejecting bearing solution sets that do not conform to the culling criterion and to the distribution criterion. The culling criterion identifies members of the group of target parameters that are deemed to significantly affect the merit of a solution, for example accuracy and stability of a solution. The culling criterion may select a single, critical target parameter or any combination of target parameters. The distribution criterion forms a comparative measure against which to compare the parameter values selected according to the culling criterion. This may be in the form of an absolute value of a given parameter, or it may be the values of a particular combination of several parameters. The computed value of the chosen parameter relative to its mathematical mean is compared with the distribution criterion and the bearing solution set is accepted, or alternatively rejected as falling outside acceptable bounds and discarded as a viable solution set. The culling results in a smaller solution sample space which is incorporated into the specific data base and a new mathematical mean and distribution is computed.

In the present method, the optimal solution is that solution, taken from the remaining solution sample space, that is closest to the mean in target range, course and speed. The optimal solution is displayed and may include a presentation of the remaining non-optimal solutions, thus showing a solution spread indicating confidence, or lack thereof, in the solution.

Thus there has been described a new and optimized, deterministic bearings only target motion analyses technique. This method greatly enhances the stability of the four bearing target motion analysis solution, and provides to the operator with a real time solution as well as an indication of the validity of the solution. This indication of solution validity does not necessarily require any prior knowledge of bearing error statistics. Because this deterministic technique does not require continuous or sequential data to arrive at a solution, it is particularly useful in short range target tracking situations when continuous bearing track is difficult to maintain.

It is to be understood that the above-described method is merely illustrative of some of the many specific methods and embodiments which represent applications of the principles of the present invention. Clearly, numerous alternative arrangements can be readily devised by those skilled in the art without departing from the scope of the invention.

What is claimed is:

1. A deterministic, bearings only, target motion detection method comprising the steps of:

providing a moving platform including a bearing detection device;

successively and periodically recording the bearing and time of arrival of a target of interest while the platform is moving to provide a multiplicity of stored bearings, and wherein the platform direction is changed during the recording process;

selecting a candidate set of four bearings from the multiplicity of stored bearings, and wherein one bearing of the set occurs prior to the change in platform direction;

computing a set of n target bearing solutions from the candidate set of bearings and adjacent bearings;

computing the mean target range, course and speed from the set of n target bearing solutions in accordance with a predefined relationship;

discarding any solution exhibiting parameters deviating from a respective mean by a predefined amount;

selecting an optimal solution from the remaining set of solutions that is the closest to the mean in target range, course and speed.

2. The method of claim 1 which further comprises the steps of:

recomputing the mean range, course and speed of the target from the remaining set of solutions subsequent to the discarding step; and discarding any solution exhibiting parameters outside a predefined variance from a respective mean until a final solution closer to the mean of a user specified criterion is obtained.

3. The method of claim 2 which further comprises the step of:

displaying the optimum solution and an envelope comprising the remainder of the solutions.

4. The method of claim 1 wherein the step of selecting the original set of candidate bearings comprises the steps of:

selecting the earliest and latest bearings as the first and second bearings of the candidate set;

computing the angular difference between the first and second bearings;

selecting the bearing that is closest to ⅔ of the total bearing spread as the third bearing; and selecting the bearing that is closest to ⅗ of the total bearing spread as the fourth bearing.

5. The method of claim 1 wherein the step of selecting the original set of candidate bearings comprises the steps of:

selecting the earliest and latest bearings as the first and second bearings of the candidate set;

computing the time difference between the first and second bearings;

selecting the bearing that is closest to ⅔ of the total time difference as the third bearing; and selecting the bearing that is closest to ⅗ of the total time difference as the fourth bearing.

6. A deterministic, bearings only, target motion detection method comprising the steps of:

providing a moving platform including a bearing detection device;

successively and periodically recording the bearing, and time of arrival thereof of a target of interest while the platform is moving, and the speed, direction and position of the platform at the time each respective recordings are made;

changing the direction of motion of the platform during the recording sequence;

selecting a first four bearing set in accordance with a predetermined criterion, and wherein one bearing precedes the change in direction of the platform;

selecting additional four bearing sets comprising selected ones of the first four bearing set and adjacent bearings;

computing the mean values of target range, course and speed from all bearing sets in accordance with a predefined relationship;

culling out those of the four bearing sets whose respective values of target range, course or speed differ from the respective means by a preselected amount;

displaying the results using predefined criteria;

using the resulting set of solutions, computing the mean range, course and speed, find a single solution closest to the computed mean, displaying the solution as the optimized solution, and displaying a range envelope around the final set of solutions.

7. The method of claim 6 which further comprises the steps of:

recomputing the mean range, course and speed of the target from the remaining set of solutions subsequent to the discarding step; and discarding any solution exhibiting parameters outside a predefined variance from a respective mean until a final solution closer to the mean of a user specified criterion is obtained.

8. The method of claim 7 which further comprises the step of:

displaying the optimum solution and an envelope comprising the remainder of the solutions.

9. The method of claim 8 wherein the step of selecting the original set of candidate bearings comprises the steps of:

selecting the earliest and latest bearings as the first and second bearings of the candidate set;

computing the angular difference between the first and second bearings;

selecting the bearing that is closest to ⅔ of the total bearing spread as the third bearing; and selecting the bearing that is closest to ⅓ of the total bearing spread as the fourth bearing.

10. The method of claim 8 wherein the step of selecting the original set of candidate bearings comprises the steps of:

selecting the earliest and latest bearings as the first and second bearings of the candidate set;

computing the time difference between the first and second bearings;

selecting the bearing that is closest to ⅔ of the total time difference as the third bearing; and selecting the bearing that is closest to ⅓ of the total time difference as the fourth bearing.

11. The method of claim 8 wherein the step of selecting the original set of candidate bearings comprises the steps of:

selecting the bearing having the highest signal to noise ratio as the first bearing;

selecting the bearing having the three next highest signal to noise ratio as the second, third and fourth bearings.

12. The method of claim 8 wherein the step of selecting the original set of candidate bearings comprises the steps of:

selecting the latest bearing as the first bearing;

dividing the remaining spread of bearings into three sections of equal bearing spread; and selecting the respective bearings in each section that have the highest signal to noise ratio as the second, third and fourth bearings.

* * * * *